(12) United States Patent
Park et al.

(10) Patent No.: US 8,280,861 B1
(45) Date of Patent: Oct. 2, 2012

(54) IDENTIFYING DUPLICATE ELECTRONIC CONTENT BASED ON METADATA

(75) Inventors: Tim Park, Santa Cruz, CA (US);
Dmitry Dolinsky, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/249,441

(22) Filed: Sep. 30, 2011

Related U.S. Application Data

(63) Continuation of application No. 13/007,054, filed on Jan. 14, 2011.

(51) Int. Cl.
*G06F 7/00* (2006.01)
*G06F 17/00* (2006.01)

(52) U.S. Cl. .................... 707/692; 707/749

(58) Field of Classification Search .......... 707/692, 707/749, 999.05
See application file for complete search history.

(56) References Cited

U.S. PATENT DOCUMENTS

| | | | |
|---|---|---|---|
| 6,272,467 B1 * | 8/2001 | Durand et al. ................ 705/5 |
| 7,716,317 B2 | 5/2010 | Kumar et al. | |
| 7,725,475 B1 * | 5/2010 | Alspector et al. ............. 707/758 |
| 7,747,582 B1 * | 6/2010 | Kaminski, Jr. ................ 707/687 |
| 2005/0091275 A1 | 4/2005 | Burges et al. | |
| 2005/0141709 A1 * | 6/2005 | Bratton ......................... 380/201 |
| 2006/0041597 A1 * | 2/2006 | Conrad et al. ................. 707/200 |
| 2008/0091725 A1 | 4/2008 | Hwang et al. | |
| 2008/0155192 A1 * | 6/2008 | Iitsuka ........................... 711/114 |
| 2009/0089326 A1 * | 4/2009 | Balasubramanian ....... 707/104.1 |
| 2009/0300761 A1 * | 12/2009 | Park et al. ....................... 726/23 |
| 2010/0114877 A1 * | 5/2010 | Adams et al. ................. 707/722 |
| 2011/0191305 A1 * | 8/2011 | Nakamura et al. ............ 707/692 |

OTHER PUBLICATIONS

U.S. Appl. No. 11/468,265, filed Aug. 29, 2006, Baluja et al.

* cited by examiner

*Primary Examiner* — Cam Truong
(74) *Attorney, Agent, or Firm* — Fish & Richardson P.C.

(57) ABSTRACT

Methods, systems, and apparatus, including computer programs encoded on a computer storage medium, for de-duplicating electronic content based on comparing metadata. In one aspect, a method includes comparing first metadata associated with a first item of electronic content to second metadata associated with a second item of electronic content, and generating a score based on the comparison. The method also includes establishing that the first and second items of electronic content comprise potentially duplicate content when the score is greater than a predetermined threshold value, and providing information identifying either the first or second items of electronic content for display when establishing that the first and second items of electronic content comprise potentially duplicate content.

18 Claims, 3 Drawing Sheets

IDENTIFYING DUPLICATE ELECTRONIC CONTENT BASED ON METADATA

CROSS REFERENCE TO RELATED APPLICATIONS

This application claims priority to U.S. application Ser. No. 13/007,054, filed on Jan. 14, 2011, entitled "Identifying Duplicate Electronic Content Based on Metadata," the entire contents of which are hereby incorporated by reference.

BACKGROUND

A user may consume electronic content by, for example, watching a video recording, reading an electronic book, playing a video game, or listening to an audio recording or ringtone. The user may initially store a copy of the electronic content on one device, and may copy the electronic content (or different versions of the electronic content) to other devices. For instance, a user may copy electronic content from a media player device to a server on the Internet, so that the user may later access the electronic content using other devices.

SUMMARY

According to one aspect, the subject matter described in this disclosure may be implemented in a process for generating a score for two or more items of electronic content based on the extent to which metadata associated with the items of electronic content matches. The items of electronic content may be established as potential duplicates depending upon whether the score satisfies a threshold. When two or more items of electronic content are potential duplicates, only one of the items of electronic content may be initially displayed on a list of items of electronic content, one of the items of electronic content may be deleted or otherwise filtered, or only one of the items of electronic content may be automatically communicated to another device, e.g., one or more Internet-based media servers, for storage.

In additional implementations, only exact matches of metadata are considered when generating the score, or exact matches of metadata increase the score to a greater extent than partial metadata matches. A metadata match may result in the score being incremented by a predefined, static amount, or matches of certain metadata may affect the amount that the score is incremented when a different metadata match occurs.

Matches of metadata that identify an item of electronic content more uniquely, such as a title, album name, or release date, may increase the score to a greater extent than matches of metadata that identify the item of electronic content less uniquely, such as a track number, genre, or the first letter of the artist's name. The metadata for all items of electronic content may be compared against each other, or a subset of the items may be selected for metadata comparison based on initial selection criteria.

In general, one aspect of the subject matter described in this disclosure may be embodied in methods that include the actions of comparing first metadata associated with a first item of electronic content to second metadata associated with a second item of electronic content, based upon the comparison, generating a score, establishing that the first and second items of electronic content include potentially duplicate content when the score is greater than a predetermined threshold value, and providing information identifying either the first or second items of electronic content for display when establishing that the first and second items of electronic content include potentially duplicate content.

Other embodiments of these aspects include corresponding systems, apparatus, and computer programs, configured to perform the actions of the methods, encoded on computer storage devices.

These and other embodiments may each optionally include one or more of the following features. For instance, displaying information includes displaying, on a user interface, either the first metadata or second metadata only when establishing that the first and second items of electronic content include potentially duplicate content; comparing the first metadata with the second metadata includes comparing values of each field of the first metadata with values of each corresponding field of the second metadata, and determining whether the first and second values correspond for each field; generating the score includes determining a weight associated with a metadata field included in the first metadata and the second metadata, and incrementing the score by the weight when a value of the metadata field in the first metadata matches a value of the metadata field in the second metadata; and/or generating the score further includes decrementing the score by a second weight when the value of the metadata field in the first metadata does not match the value of the metadata field in the second metadata.

In other examples, the first and second items of electronic content each are audio or video files, and the first and second metadata each include a title field and an artist field; generating the score includes incrementing the score when values for at least one of the title field and the artist field in the first metadata match values for at least one of the title field and the artist field in the second metadata; comparing the first metadata with the second metadata includes generating a first hash value based on the first metadata using a hashing algorithm, generating a second hash value based on the second metadata using the hashing algorithm, and comparing the first hash value with the second hash value; and/or generating the first hash value includes using the hashing algorithm on a title field value and an artist field value of the first metadata and generating the second hash value includes using the hashing algorithm on a title field value and an artist field value of the second metadata.

In further examples, determining, based on comparing the first hash value with the second hash value, that the first hash value matches the second hash value, and the first metadata associated with the first item of electronic content is compared to the second metadata associated with the second item of electronic content after determining that the first hash value matches the second hash value; receiving information indicating whether the first and second items of electronic content include duplicate content, and based on the information, adjusting the generating of the score based on the comparison of the first and second metadata; and/or receiving information indicating whether the first and second items of electronic content include duplicate content, and based on the information, adjusting the predetermined threshold value.

The details of one or more implementations are set forth in the accompanying drawings and the description below. Other potential features and advantages will become apparent from the description, the drawings, and the claims.

DETAILED DESCRIPTION

Figure 1:
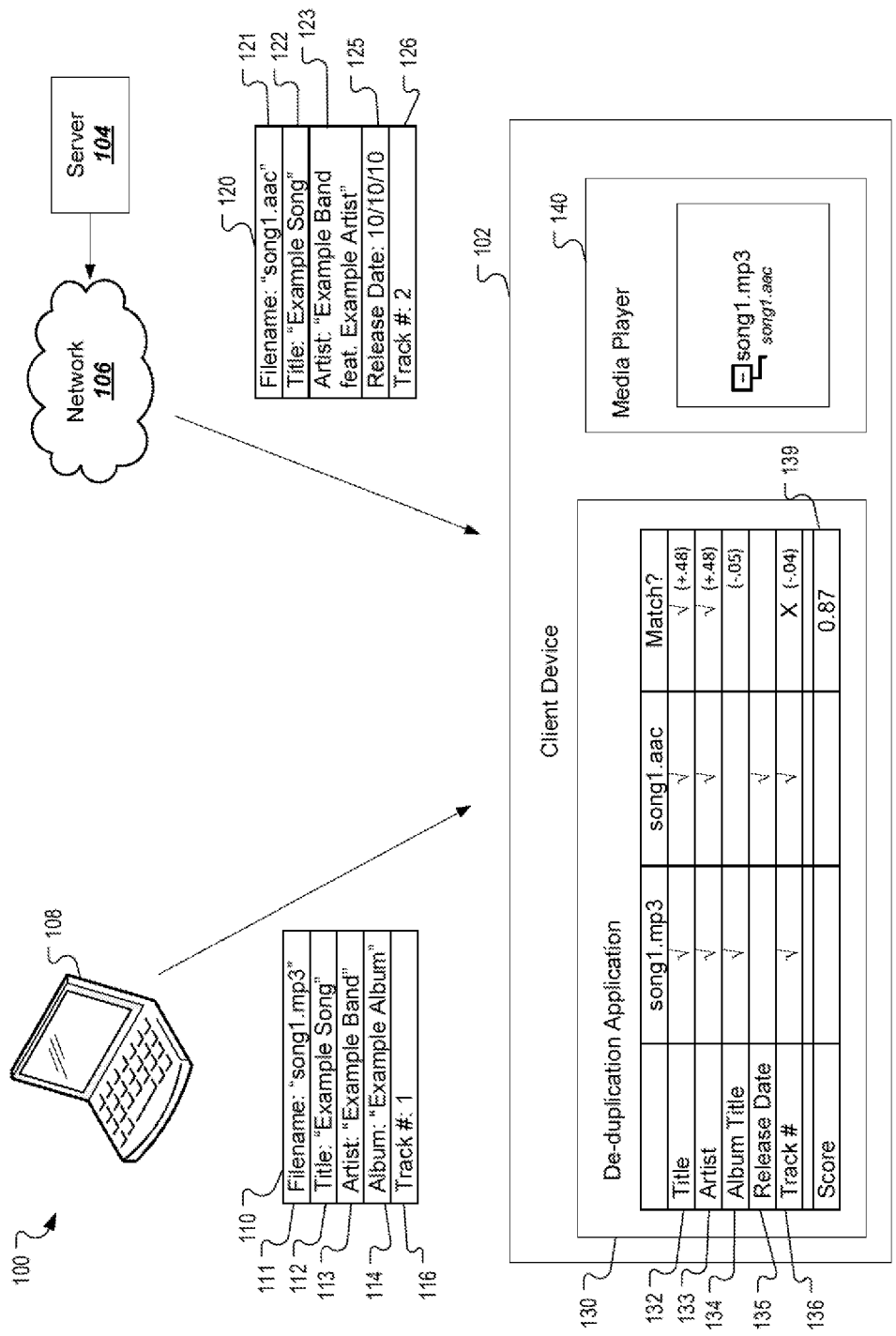
FIGS. 1 and 3 are diagrams of example systems for identifying duplicate electronic content based on metadata.

FIG. 1 is a diagram of an example system 100 for identifying duplicate electronic content based on metadata. In general, identification of duplicate electronic content occurs by generating a score for two or more items of electronic content based on the extent to which metadata associated with the items of electronic content matches, and by establishing whether the items of electronic content are duplicates or potential duplicates depending upon whether the score satisfies a threshold.

The example system 100 includes a client device 102 and a server 104, connected by way of a network 106, as well as an additional client device 108. The network 106 may be a private network, such as an intranet, a public network, such as the Internet, or any appropriate combination thereof. The client devices 102 and 108 may be, for example, laptop computers, media players, desktop computers, e-book readers, mobile phones, PDAs (Personal Digital Assistants), smart phones, tablet computers, handheld or mobile devices, or any other suitable device or combination of devices.

The client device 102 and the additional client device 108 each include a processor and a computer-readable medium. The processor may be a processor suitable for the execution of a computer program, such as a general or special purpose microprocessor. In some implementations, the client devices 102 and the additional client device 108 each include more than one processor. The computer-readable medium stores and records information or data, and may be an optical storage medium, magnetic storage medium, flash memory, or any other storage medium type.

The client device 102 stores applications, such as a media player application 140 and a de-duplication application 130, on the computer-readable medium. The media player application 140 may be configured to play an item of electronic content (e.g., a movie or other video, a song or other audio, an electronic book, etc.) for consumption by the user. The media player application 140 may play, for example, items of electronic content received (e.g., streamed or downloaded) from the server 104 or copied from the additional client device 108. The media player application 140 may display information identifying the electronic content that is accessible to the client device 102.

The server 104 also includes a processor and computer-readable medium. The processor may be a processor suitable for the execution of a computer program, such as a general or special purpose microprocessor. In some implementations, the server 104 may be a server system that includes more than one server. The computer-readable medium stores and records information or data, and may be an optical storage medium, magnetic storage medium, flash memory, or any other storage medium type.

The client device 102 may receive or sideload electronic content from the additional client device 108, such as when the client device 102 and the additional client device 108 are connected and synchronized. The electronic content may be, for example, an audio file 110 named "SONG1.MP3". The audio file 110 may be copied to the client device 102 from an external storage medium, or the audio file 110 may be transferred to the client device 102 over a network or other type of connection.

The audio file 110 may encode a song, and may include metadata pertaining to the song. The metadata may include a title 112 of the song (in the figure, "Example Song"), an artist 113 who performs the song (in the figure, "Example Band"), the title of an album 114 that includes the song (in the figure, "Example Album"), and a track number 115 of the song on the identified album (in the figure, "1").

The metadata may include other information pertaining to the song, including, for example, album artwork, song length, a release date, a genre, a bit rate, a format, and beats per minute. The metadata may be manually associated with the file, such as when a user types in a song name using a metadata assignment application. The metadata may also be automatically associated with the file, such as when characteristics of a file are compared with a database to discover and assign metadata that are appropriate to be automatically associated with the file.

The client device 102 may also receive electronic content from the server 104. The server 104 may store a collection of electronic content, such as a music library, uploaded by the user for access by the user's various client devices. The client device 102 may receive music that is streamed from the server 104, or the client device 102 may download songs from the server 104. In the illustrated example, the client device 102 receives an audio file 120 named "SONG1.AAC" from the server 104. The audio file 120 also encodes a song, and also includes metadata pertaining to the song. The metadata may include, for example, a title 122, an artist 123, a release date 124, and a track number 125.

Two different audio files may encode the same song, but because the song may be encoded in different formats, the actual data stored by the different audio files may not be the same. In this example, the audio file 110 is an MP3 file, while the audio file 120 is an AAC file. As a result of the different encoding, the audio file 110 and the audio file 120 may encode the same song, but may not include identical data. For example, a bit-wise comparison of the two files may indicate that the files have different lengths, and store different data.

In addition to differences caused by different encoding techniques, other differences may occur when a song is encoded in different audio files. For example, the audio files 110, 120 may be encoded using the same encoding technique (e.g., MP3), however they may be encoded at different bit rates, or may encode different portions of the song or different lengths of silence before, after, or during the song. Such files, while including different data, may be considered to be substantively duplicate. A user may wish to simplify their lists of electronic content items by filtering out information identifying items of electronic content that are substantively duplicate, or potentially substantively duplicate.

The de-duplication application 130 may compare the metadata of the audio files 110, 120 to determine whether the files are potential duplicates. In some implementations, the de-duplication application 130 may compare metadata fields of one file with the corresponding metadata fields of the other file to determine if the values correspond with one another. Such a comparison may occur after another process identifies the files as candidates for de-duplication, for example to avoid processing files that are clearly not duplicates (i.e., an audio file with a video file, or a "classical" genre song with a "drum and bass" genre song). In some implementations, the de-duplication application 130 compares only the metadata between the two files, and does not compare the content of the two files. By not comparing the content of the two files, the de-duplication application 130 may detect files that are duplicates in substance (e.g., encode the same song) but are not duplicates in data (e.g., are bit-wise different). In such implementations, the de-duplication application 130 does not utilize the content of the two files (e.g., does not create a hash or digest of the content of the two files) to determine that one of the two files is potentially duplicate. The de-duplication application 130 makes such a determination based solely upon the metadata associated with the two files.

Such implementations may be different from conventional de-duplication technology that compares files based on hashes or digests of content. For example, if two songs that are substantively identical songs are encoded in different formats or in some other different manner, hashing the content or parts of the content of the two files may result in hash values that are not the same. In such implementations, then, the two files may be determined to be different and thus not duplicate, when they substantively are. By contrast, hashing the metadata of content that is encoded in different ways may still result in hash values that are the same or similar, increasing the chance that the duplicate content will be detected.

In an example of the comparisons performed by the de-duplication application 130, the title field 112 for the file 110 contains the value "Example Song." The corresponding title field 122 for the file 120 also contains the value "Example Song." Thus, the de-duplication application 130 may compare the two title fields and find that they match 132. The other metadata fields may be compared in a similar manner.

In some implementations, the metadata values may be normalized before being compared. Normalization may include changing all letters to lowercase or uppercase, taxonomizing metadata field values, removing parenthetical information such as "(remix)" or "(live)," removing leading articles such as "a" or "the," and other operations. For example, audio file 120 may include in the artist field 123 the value "Example Band feat. Example Artist," indicating that the song is performed by "Example Band" and features "Example Artist." In some implementations, the normalization may include detecting the string "feat." or "featuring" and stripping the value of the string and the following data.

Thus, "Example Band feat. Example Artist" may be normalized to "Example Band" or "example band" before comparison to the artist field 113 of audio file 110. In this example, "Example Band feat. Example Artist" of audio file 120 may then match "Example Band" of audio file 110. The de-duplication application 130 may therefore determine the artist information matches 133 for the two audio files. In some implementations, the values may be normalized and compared strictly for exact matches. In some implementations, algorithms may be used to determine a similarity between the two values, for example, accounting for typographical errors, where higher levels of similarity may affect a score more profoundly than lower levels of similarity.

A score 139 may be generated using the comparisons of the metadata fields. The score may be a function of the correspondence between matching fields. For example, the score may be a weighted or unweighted aggregation of the number of fields that match between the two files. For instance, some metadata fields may be weighted so that a match between the weighted fields affects the score more than fields that are not weighted. For example, two files with matching title values may be more likely to be duplicates than two files with matching track number values. In some implementations, the title field may be weighted more than the track number field. In some implementations, if a similarity algorithm is used to compare field values, each field comparison may produce a similarity score that is used to generate the score 139. In some implementations, the similarity scores may be compared to threshold values and determined to be matches if the similarity score is above the threshold value.

In some implementations, fields that contain empty values, or that include values in the metadata for only one file may be ignored. For example, audio file 110 includes the value "Example Album" in the album field 114. The audio file 120 does not include a value for the album field. Thus the de-duplication application 130 may find the two values for the album field do not match 134, or may ignore the album field 114 when computing a score. Similarly, the audio file 120 includes release date 125 information, while audio file 110 does not. The score 139 may be unaffected by the lack of data in these two fields, or the lack of data may be considered a mismatch, resulting in the score 139 being lowered or decremented.

In some implementations, fields that contain values that differ may lower the score 139. For example, audio file 110 includes the value "1" in the track number field 115, while audio file 120 includes the value "2" for the track number field 126. The de-duplication application 130 may thus determine the two fields do not match 136. The different track numbers may lower the score 139. In some implementations, the weighting of the fields in scoring may equally affect the lowering of the score if the weighted fields do not match. For example, a different title in the two files may lower the score more than a different track number in the two files. In some implementations, only matching fields are counted, and thus mismatching fields may not affect the score.

The score may be adjusted upwards or downwards to different extents, depending upon whether particular metadata matches of does not match. For instance, if the "track number" metadata matches for two files, the score may be incremented by a small extent, since a matching track number is considered to be a weak indicator that the two files are potentially duplicates. A mismatch of the "track number" metadata may be a stronger signal, however, that the two files are not potentially duplicates, and may result in the score being decremented by a larger extent.

Additionally or alternatively, the weighting of a field may be changed dynamically with each comparison. Further, the weighting of the fields may also or alternatively be dependent on other metadata field weights or matches in metadata values of other metadata fields. For example, if the values for the "album title" and "album artwork" metadata fields match for two files, the "track number" metadata may be given more weight, since there is an indication that the two files are on the same album. Said another way, in the absence of other metadata matches, a "track number" metadata match may increment a score by a particular amount. If another metadata match has occurred, however, a "track number" metadata match may increment the score by a larger amount.

The score 139 may be compared to a threshold value. If the score 139 is higher than the threshold value, the files may be determined to be duplicates or potential duplicates. In FIG. 1, for example, the score of "0.87" is compared to a threshold value of "0.75," resulting in the determination that the two files are potential duplicates. The threshold value should be chosen to be relatively high, so as to bias toward showing (i.e., not hiding) potentially duplicate electronic content.

The client device 102 may initially display information identifying one of the files and may initially hide information identifying the other, for example in a music library displayed by the media player application 140. The information identifying the other file may be displayed later, for example in response to a user requesting that potential duplicates be displayed, after a predetermined amount of time, after the displayed information is selected, or in response to any other action. The displayed information may be information identifying the audio file 110 or the audio file 120, chosen either arbitrarily, based on which file was stored first or last, based on the quality of each respective file, or based on any other factor. Information specifying that a particular file is potentially a duplicate of another file may also be stored in the metadata of either file.

The file whose identifying information is displayed may be determined, for example, by comparing the audio quality of the two files, such as bit rate and sample rate. Alternatively, the file with more metadata values may be displayed. Additionally, the metadata values may be aggregated or combined to show metadata from both files in identifying any one of the files. For example, audio file 110 may be displayed in the media player 140 including the release date 125 information from audio file 120. In some implementations, discrepancies in the metadata values, for example, the track numbers 116, 126, may be automatically verified (e.g., against an online database) or manually verified to determine which metadata value is more likely correct and should be displayed.

In some implementations, a hash value may be generated based on the metadata values using a hashing algorithm. For example, a hash value may be generated based on some or all of the metadata values for the audio file 110, and a hash value may be generated based on some or all of the metadata values for the audio file 120. The hash values may then be compared with each other to determine if the metadata of each file should be compared so as, for example, to generate the score. The hash value may be generated using a single item of metadata or a combination of multiple items of metadata that more strongly identify an item of electronic content, such as a song title, album or artist, or a combination thereof.

In some implementations, the hash value may be generated based on all available metadata. Metadata fields that contain no value may be left blank in the hash value as well, so that the fields may be ignored when compared with other hash values. In some implementations, the metadata values of a subset of the metadata fields may be used to generate the hash value. For example, hash values may be generated using the metadata values of the title field, the artist field, and the album field for each file. The hash values may be compared to determine if any of the three fields contain values that match. The de-duplication application 130 may determine that if the hash values have no match (i.e., the song title, artist and album title information are all different or blank), the two files are likely not potential duplicates. In some implementations, the de-duplication application 130 may generate scores by comparing all the metadata fields for two files if the two files contain at least one match in the hash values based on title, artist, and album title.

Figure 2:
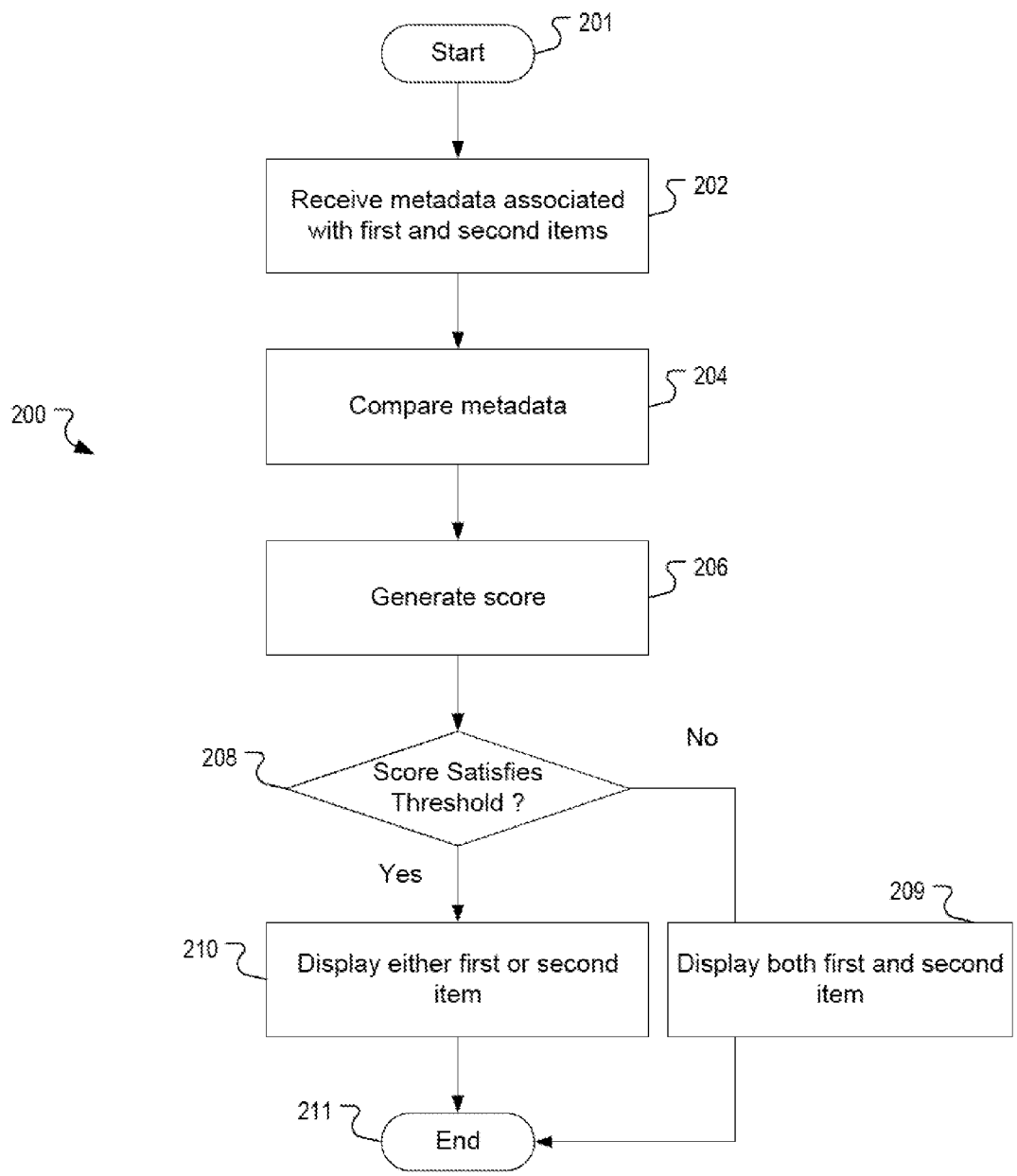
FIG. 2 is a flowchart of an example process for identifying duplicate electronic content based on metadata.

FIG. 2 is a flow chart illustrating an example process 200 for identifying duplicate electronic content based on metadata. The process 200 includes the actions of receiving first metadata associated with a first item of electronic content, comparing the first metadata to second metadata associated with a second item of electronic content, and based on the comparison, generating a score. The process 200 also includes the actions of comparing the score to a predetermined threshold value and establishing that the first and second items comprise potentially duplicate content if the score is greater than the threshold value, and displaying information identifying either the first or second item of electronic content.

In detail, when the process 200 begins (201), the client device receives metadata associated with two or more items of electronic content (202). The item of electronic content may be, for example, a movie or other video recording, an audio recording, a ring tone, an electronic book, a whitepaper, a periodical, a video game, a software program, wallpaper, a mobile device application, or some other type of electronic content. The metadata may include information such as a title, an author, an artist, an album, a release date, a publication date, a filename, and other information pertaining to the electronic content.

A client device may receive electronic content, such as an audio file, from a server over the network. For example, the electronic content may be received when the user of the client device downloads or streams the audio file from a content publication service. The client device may also receive electronic data from the additional client device. For example, when the client device and a different client device become physically connected, the audio file may be received when a copy or synchronization operation is performed.

The two or more items of electronic content may encode the same song, or portions of the same song, however the data that makes up the two or more items of electronic content may not be identical. For instance, the items of electronic content may be encoded using different encoding techniques or quality characteristics, e.g., bit rates, or may encode different amounts of silence.

Instead of or in addition to performing a bit-by-bit comparison of files, the client device compares the metadata of the first item of electronic content to the metadata of the second item of electronic content (204). In doing so, the result of the comparison may indicate whether the items of electronic content correspond to the same content, and are therefore duplicate or potential duplicate items of electronic content.

The second item of electronic content may, like the first item of electronic content, be any type of electronic content. The second metadata may include similar types of information as the first metadata. The client device may compare the first metadata to the second metadata by determining corresponding metadata fields in each set of metadata. The value of each field may be compared to determine if the values are the same or potentially the same. The values may be normalized before comparison. Comparing the first metadata to the second metadata may also include generating hash values based on a portion of the metadata fields using a hashing algorithm and comparing the hash values.

The client device generates a score based on the comparison between the first and second metadata (206). In some implementations, the client device compares first and second hash values generated based on portions of the first and second metadata to determine if a score is to be generated. The score may be based on a comparison between the first and second metadata, for example, based on matching values of metadata fields. A match of metadata may increment a score to the same, lesser, or greater amount as a mismatch of the metadata. The amount to which a score is incremented may be predefined based upon the type of metadata, or may be dynamically determined based on whether other, different metadata matches or does not match.

The metadata fields may be weighted differently relative to each other. For example, the title, artist, release date, disc number, artwork file name, and album title fields for songs may be weighted to more strongly influence the score than fields such as track number, genre, beats per minute, or year of release. The weighting may reflect a confidence that matching values indicate potentially duplicate content. In the example, two songs with the same title and/or artist may be more likely duplicates than two songs with the same track number and/or year of release. A metadata field such as beats per minute may be weighted somewhere in between title and track number.

The score may be compared to a predetermined threshold value (208). If the score does not satisfy (e.g., is lower than) the threshold value, the two items may contain different content, and thus the client device may display both items (209) and the process ends (211). If the score satisfies (e.g., is equal to or greater than) the threshold value, the two items of electronic content may be considered to be potentially duplicates (e.g., the two items are the same song or same video clip or same book). The client device may then display either the first or second item of electronic content (210).

The client thus may hide the other item of electronic content, displaying only one item to the user. The metadata displayed with the item may be the metadata associated with the item displayed. Thus the first metadata may be displayed if the first item is displayed or the second metadata with the second item. Alternatively or additionally, the metadata may be combined or portions of the other item's metadata may be displayed.

Figure 3:
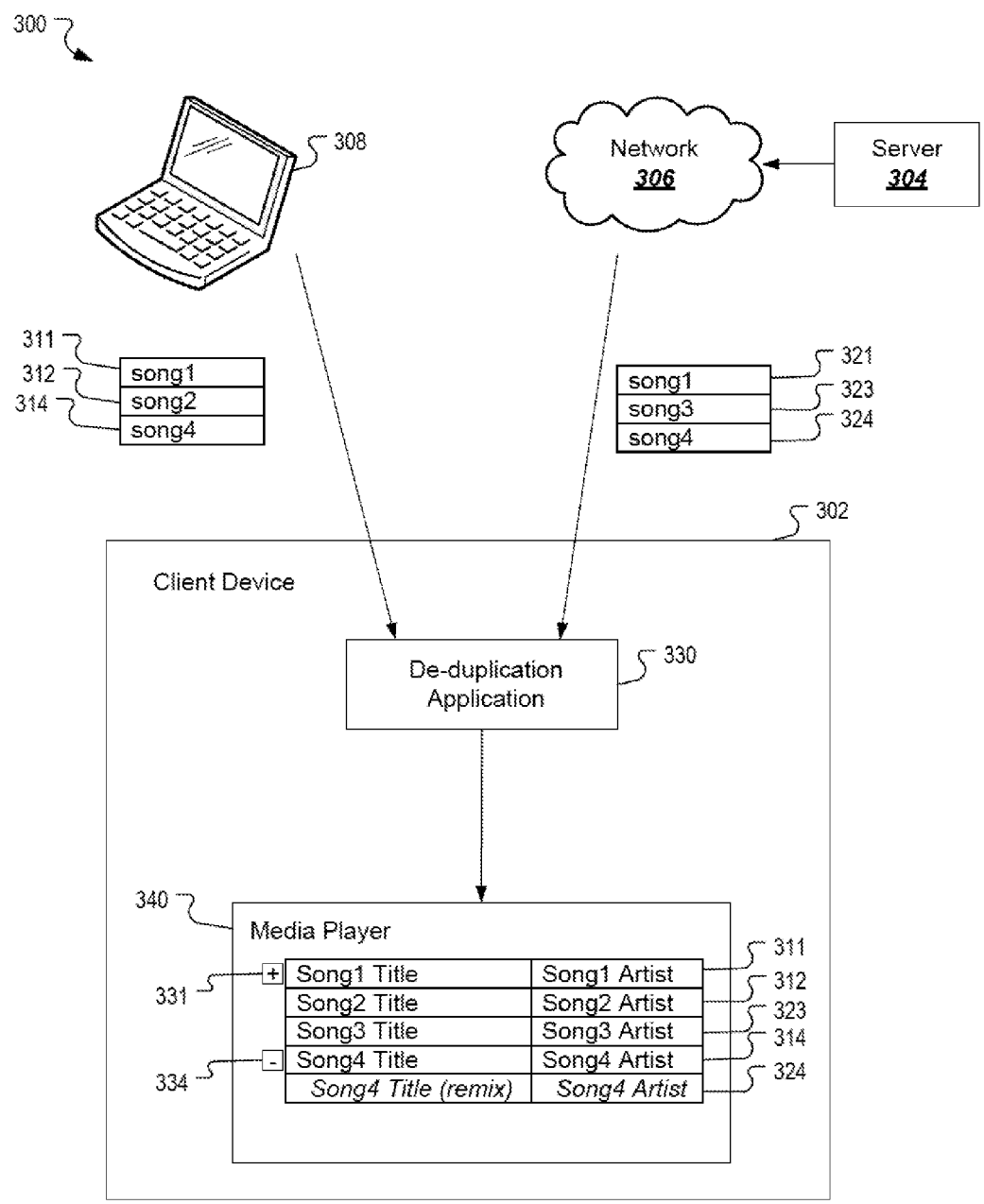

FIG. 3 is a diagram of an example system for identifying duplicate electronic content using metadata. Briefly, a client device 302, which is similar to the client device 102 of FIG. 1, receives songs 311, 312, 314, from an additional client device 308, which is similar to the additional client device 108. The client device 302 also receives songs 321, 313, 324, from a server 304, which is similar to the server 104. A de-duplication application 330, which is similar to the de-duplication application 130, de-duplicates the potentially duplicate songs. A media player application 340, which is similar to the media player application 140, displays the songs, hiding potential duplicates.

In further detail, the client device 302 receives songs from the additional client device 308. The songs may include song1 311, song2 312, and song4 314. The client device 302 also receives songs from the server 304 through a network 306, which is similar to the network 106. The songs received from the server 304 may include song1 321, song3 323, and song4 324. In the illustrated example, song1 311 received from the additional client device 308 and song1 321 received from the server 304 are potential duplicates. Thus, while the corresponding files may not be identical, the same song is encoded in both. Potential duplicates of song4 are likewise received from both devices 304, 308.

The de-duplication application 330 may run on the client device 302 as the client device 302 receives the electronic content. For example, the items received from the additional client device 308 may have been received previously and stored on the client device 302. As the client device 302 receives new items from the server 304, the de-duplication application 330 may check for potential duplicates among the new items. Alternatively, the client device 302 may already have stored the items from the server 304 and the items from the additional client device 308 may be checked for potential duplicates. Alternatively or additionally, the client device 302 may receive content that is streamed from the server 304 without storing the items on the client device 302. The de-duplication application 330 may still check for potential duplicates against the items stored on the server 304 and accessed by the client device 302. In some implementations content may be received from multiple sources at the same time and checked against each other for potential duplicates as well as against content already stored on the client device 302.

The de-duplication application 330 may de-duplicate the items received using metadata as described above. In this example, as a result, the media player application 340 displays song1 311, song2 312, song3 323, and song4 314. The media player application 340 may display songs with potential duplicates with an indicator that a potential duplicate has been hidden. For example, the media player application 340 may display a plus sign 331 next to a song with a potential duplicate. In the example, song1 311 has a plus sign 331 next to the display to indicate that a potential duplicate of song1 311 (namely, song1 321) has been hidden from the user. The user may click on the plus sign 331 to display the hidden potential duplicate. The plus sign 331 may then change to a different indicator, for example, a minus sign 334 to indicate that a hidden potential duplicate is being displayed. In the example, both duplicates of song4 314, 324 are shown to the user. The potential duplicate item may be displayed in a format different from the other songs, for example, a different color, font, indentation, or other format. The song4 324 received from the server 304 may, for example, have a different song title that, when normalized, is determined to be the same as the song title of the song4 314 received from the additional client device 308.

The media player application 340 may include a mechanism for the user to indicate that two items have been incorrectly determined to be potential duplicates. The media player application 340 may then display both items separately. The de-duplication application 330 may receive such information and store the information. The de-duplication application 330 may also incorporate the information as feedback for the de-duplication process. For example, if a threshold number of indications of incorrect determinations is received, the de-duplication application 330 may raise the threshold value that is used for comparison to the score when determining two items are potential duplicates. Additionally, the de-duplication application 330 may adjust the similarity algorithms based on patterns detected between metadata of items incorrectly determined to be duplicates.

The media player application 340 may also include a mechanism for the user to indicate that two items are potential duplicates. The media player 340 may then hide one of the items in the display. The media player 340 may include a mechanism for the user to choose which item is displayed and which one is hidden. The de-duplication application 330 may receive such information and store the information. The de-duplication application 330 may also incorporate the information as feedback for the de-duplication process. For example, if a threshold number of indications of missed potential duplicates is received, the de-duplication application 330 may lower the threshold value that is used for comparison to the score when determining two items are potential duplicates. Additionally, the de-duplication application 330 may adjust the similarity algorithms based on patterns detected between metadata of duplicate items that were not determined to be duplicates.

In additional implementations, if two files correspond to the same content, an appropriate action can be taken to de-duplicate the files. For example, only one of the files on a list of files may be displayed initially, one of the files may be deleted or otherwise filtered, or only one of the files may be automatically communicated to another device for storage.

While the examples described have included comparison of audio files, the items of electronic content compared may be other types of electronic content, such as video files, e-books, wallpapers, image files, and video games. For example, if the two files compared are e-books, the metadata fields may include title, author, publisher, publishing date, pages, cover art, and genre. Any subsets of the metadata fields may be weighted more than others or used to generate a hash value. For example, the title, author, and publisher fields may be used to generate a hash value for comparison. In another example, if the two items of electronic content compared are video games, metadata fields can include title, developer, publisher, release date, rating, platform, cover art, and genre. Again, any subsets of the metadata fields may be weighted more than others or used to generate a hash value. For example, the title, developer, and publisher may be used to generate a hash value for comparison.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Aspects and all of the functional operations described in this disclosure may be implemented in digital electronic circuitry, or in computer software, firmware, or hardware, including the structures disclosed in this disclosure and their structural equivalents, or in combinations of one or more of them. Aspects may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this disclosure may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, processes may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Processes may be implemented in a computing system that includes a back end component, e.g., as a data server, or that includes a middleware component, e.g., an application server, or that includes a front end component, e.g., a client computer having a graphical user interface or a Web browser through which a user may interact with any implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on scope or of what may be claimed, but rather as descriptions of features specific to particular implementations. Certain features that are described in this disclosure in the context of separate implementations may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular implementations have been described. Other implementations are within the scope of the following claims. For example, the operations recited in the claims may be performed in a different order and still achieve desirable results.

What is claimed is:

1. A system comprising:
   one or more computers having one or more processors and one or more storage devices storing instructions that are executed by the one or more computers to cause the one or more computers to perform operations comprising:
   generating a first hash value based on first metadata associated with a first item of electronic content using a hashing algorithm;
   generating a second hash value based on second metadata associated with a second item of electronic content using the hashing algorithm;
   comparing the first hash value with the second hash value;
   determining, based on comparing the first hash value with the second hash value, that the first hash value matches the second hash value, then comparing the first metadata associated with the first item of electronic content to the second metadata associated with the second item of electronic content;
   generating a score based on the comparison of the first metadata with the second metadata;
   establishing that the first and second items of electronic content comprise potentially duplicate content if the score is greater than a predetermined threshold value;
   upon establishing that the first and second items of electronic content comprise potentially duplicate content, providing data for displaying a representation of the first item of electronic content adjacent to a representation of the second item of electronic content, and for identifying the second item of electronic content as a potential duplicate;
   providing data for displaying a control for a user to confirm whether the first and second items of electronic content actually comprise duplicate content;
   receiving information, from the user, confirming whether the first and second items of electronic content actually comprise duplicate content; and
   adjusting the predetermined threshold value based on the received information, wherein the adjusting the predetermined threshold value comprises
   increasing the predetermined threshold value when the user indicates that the first and second items of electronic content do not comprise duplicate content, or decreasing the predetermined threshold value when the user indicates that the first and second items of electronic content comprise duplicate content.

2. The system of claim 1, wherein comparing the first metadata with the second metadata comprises:
   comparing values of each field of the first metadata with values of each corresponding field of the second metadata; and
   determining whether the first and second values correspond for each field.

3. The system of claim 1, wherein generating the score comprises:
   determining a weight associated with a metadata field included in the first metadata and the second metadata; and
   incrementing the score by the weight when a value of the metadata field in the first metadata matches a value of the metadata field in the second metadata, or
   decrementing the score by a different weight when the value of the metadata field in the first metadata does not match the value of the metadata field in the second metadata.

4. The system of claim 1, wherein:
   the first and second items of electronic content each are audio or video files; and
   the first and second metadata each include a title field and an artist field.

5. The system of claim 4, wherein generating the score comprises incrementing the score when values for at least one of the title field and the artist field in the first metadata match values for at least one of the title field and the artist field in the second metadata.

6. The system of claim 1, wherein generating a first hash value includes generating the first hash value based on a title field value and an artist field value of the first metadata and generating a second hash value includes generating the second hash value based on a title field value and an artist field value of the second metadata.

7. A computer-implemented method comprising:
   generating a first hash value based on first metadata associated with a first item of electronic content using a hashing algorithm;
   generating a second hash value based on second metadata associated with a second item of electronic content using the hashing algorithm;
   comparing the first hash value with the second hash value;
   determining, based on comparing the first hash value with the second hash value, that the first hash value matches the second hash value, then comparing the first metadata associated with the first item of electronic content to the second metadata associated with the second item of electronic content;
   generating a score based on the comparison of the first metadata with the second metadata;
   establishing that the first and second items of electronic content comprise potentially duplicate content if the score is greater than a predetermined threshold value;
   upon establishing that the first and second items of electronic content comprise potentially duplicate content, providing data for displaying a representation of the first item of electronic content adjacent to a representation of the second item of electronic content, and for identifying the second item of electronic content as a potential duplicate;
   providing data for displaying a control for a user to confirm whether the first and second items of electronic content actually comprise duplicate content;

receiving information, from the user, confirming whether the first and second items of electronic content actually comprise duplicate content; and adjusting the predetermined threshold value based on the received information, wherein the adjusting the predetermined threshold value comprises increasing the predetermined threshold value when the user indicates that the first and second items of electronic content do not comprise duplicate content, or decreasing the predetermined threshold value when the user indicates that the first and second items of electronic content comprise duplicate content.

8. The method of claim 7, wherein generating a first hash value includes generating the first hash value based on a title field value and an artist field value of the first metadata and generating a second hash value includes generating the second hash value based on a title field value and an artist field value of the second metadata.

9. The method of claim 7, wherein comparing the first metadata with the second metadata comprises:

comparing values of each field of the first metadata with values of each corresponding field of the second metadata; and determining whether first and second values correspond for each field.

10. The method of claim 7, wherein generating the score comprises:

determining a weight associated with a metadata field included in the first metadata and the second metadata; and incrementing the score by the weight when a value of the metadata field in the first metadata matches a value of the metadata field in the second metadata, or decrementing the score by a different weight when the value of the metadata field in the first metadata does not match the value of the metadata field in the second metadata.

11. The method of claim 7, wherein:

the first and second items of electronic content each are audio or video files; and the first and second metadata each include a title field and an artist field.

12. The method of claim 11, wherein generating the score comprises incrementing the score when values for at least one of the title field and the artist field in the first metadata match values for at least one of the title field and the artist field in the second metadata.

13. A non-transitory computer-readable medium storing software comprising instructions executable by one or more computers which, upon such execution, cause the one or more computers to perform operations comprising:

generating a first hash value based on first metadata associated with a first item of electronic content using a hashing algorithm;

generating a second hash value based on second metadata associated with a second item of electronic content using the hashing algorithm;

comparing the first hash value with the second hash value;

determining, based on comparing the first hash value with the second hash value, that the first hash value matches the second hash value, then comparing the first metadata associated with the first item of electronic content to the second metadata associated with the second item of electronic content;

generating a score based on the comparison of the first metadata with the second metadata;

establishing that the first and second items of electronic content comprise potentially duplicate content if the score is greater than a predetermined threshold value;

upon establishing that the first and second items of electronic content comprise potentially duplicate content, providing data for displaying a representation of the first item of electronic content adjacent to a representation of the second item of electronic content, and for identifying the second item of electronic content as a potential duplicate;

providing data for displaying a control for a user to confirm whether the first and second items of electronic content actually comprise duplicate content;

receiving information, from the user, confirming whether the first and second items of electronic content actually comprise duplicate content; and adjusting the predetermined threshold value based on the received information, wherein the adjusting the predetermined threshold value comprises increasing the predetermined threshold value when the user indicates that the first and second items of electronic content do not comprise duplicate content, or decreasing the predetermined threshold value when the user indicates that the first and second items of electronic content comprise duplicate content.

14. The medium of claim 13, wherein comparing the first metadata with the second metadata comprises:

comparing values of each field of the first metadata with values of each corresponding field of the second metadata; and determining whether the first and second values correspond for each field.

15. The medium of claim 13, wherein generating the score comprises:

determining a weight associated with a metadata field included in the first metadata and the second metadata; and incrementing the score by the weight when a value of the metadata field in the first metadata matches a value of the metadata field in the second metadata, or decrementing the score by a different weight when the value of the metadata field in the first metadata does not match the value of the metadata field in the second metadata.

16. The medium of claim 15, wherein generating the score comprises incrementing the score when values for at least one of the title field and the artist field in the first metadata match values for at least one of the title field and the artist field in the second metadata.

17. The medium of claim 13, wherein:

the first and second items of electronic content each are audio or video files; and the first and second metadata each include a title field and an artist field.

18. The medium of claim 13, wherein generating a first hash value includes generating the first hash value based on a title field value and an artist field value of the first metadata and generating a second hash value includes generating the second hash value based on a title field value and an artist field value of the second metadata.

* * * * *

UNITED STATES PATENT AND TRADEMARK OFFICE
CERTIFICATE OF CORRECTION

| | | |
|---|---|---|
| PATENT NO. | : 8,280,861 B1 | Page 1 of 1 |
| APPLICATION NO. | : 13/249441 | |
| DATED | : October 2, 2012 | |
| INVENTOR(S) | : Tim Park et al. | |

It is certified that error appears in the above-identified patent and that said Letters Patent is hereby corrected as shown below:

Column 15, Line 24, Claim 9, after "whether" insert --the--.

Signed and Sealed this
Nineteenth Day of March, 2013

Teresa Stanek Rea
*Acting Director of the United States Patent and Trademark Office*